Figure 6:
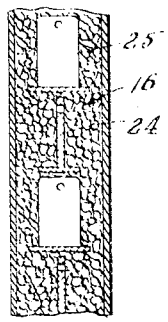

A. MESSERSCHMITT.
GENERATION OF HYDROGEN BY MEANS OF IRON.
APPLICATION FILED JUNE 26, 1912.
1,109,447.
Patented Sept. 1, 1914.
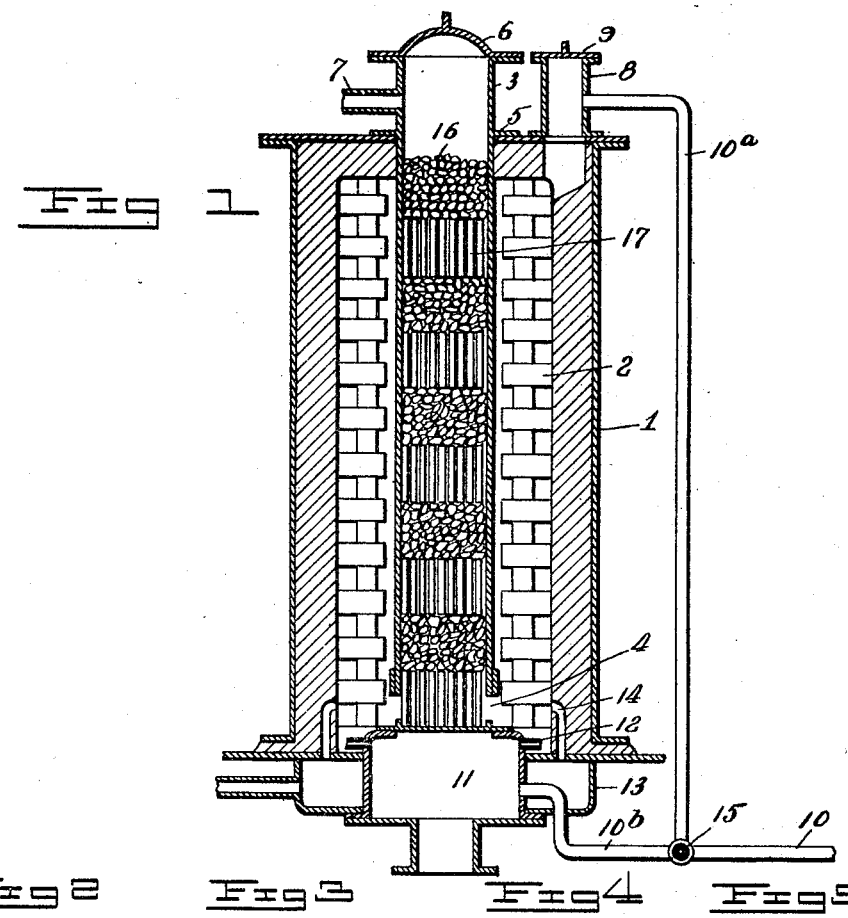
 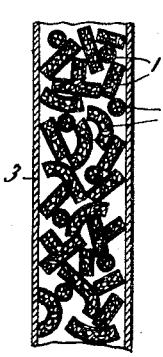 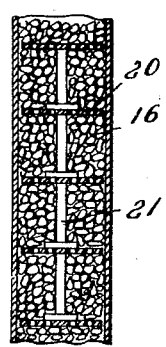 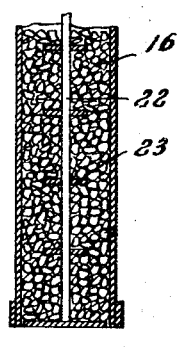
Inventor
Anton Messerschmitt A. MESSERSCHMITT.
GENERATION OF HYDROGEN BY MEANS OF IRON.
APPLICATION FILED JUNE 26, 1912.

1,109,447.

Patented Sept. 1, 1914.
2 SHEETS—SHEET 2.

Inventor
Anton Messerschmitt
By W. P. McElroy
Attorney

Witnesses

UNITED STATES PATENT OFFICE.

ANTON MESSERSCHMITT, OF STOLBERG, GERMANY.

GENERATION OF HYDROGEN BY MEANS OF IRON.

1,109,447.  Specification of Letters Patent.  Patented Sept. 1, 1914.

Application filed June 26, 1912. Serial No. 705,970.

*To all whom it may concern:*

Be it known that I, ANTON MESSERSCHMITT, a subject of the German Emperor, residing at No. 60 Rathhausstrasse, Stolberg, i. Rhineland, Germany, have invented certain new and useful Improvements in the Generation of Hydrogen by Means of Iron, of which the following is a specification.

This invention relates to the generation of hydrogen by the alternate oxidation of iron by means of steam and reduction of the resulting iron oxid by means of reducing gases. As initial material for this process it has been hitherto customary to employ spongy iron derived, for instance by reduction of iron oxids, ores, calcined pyrites, spathic iron ore, iron glance or iron turnings, or obtained in any other manner. A mixture of iron oxid and clay has also been proposed as a suitable reaction material as containing the iron in a state of fine division. It has been further proposed to convert a mixture of iron oxid, thin iron turnings, asbestos fibers, and water into solid blocks by means of heat, and to use the so obtained material as reaction material for the generation of hydrogen. The thin iron turnings in the first instance give the mass cohesion and are subsequently converted into finely divided porous, spongy iron.

In the carrying out of the known methods of generating hydrogen by the reaction of spongy iron the drawback was encountered that the ferroso-ferric oxid formed during the reaction easily fuses and is the cause of disturbances such as obstruction of passages, fusing to the walls of the retorts, and the like, while when foreign materials such as asbestos, clay and the like are used, the output of the apparatus is considerably diminished.

Owing to the presence of impurities introduced by the gangue or by the heating gases into the reaction material, readily fusible compounds are frequently formed such as iron silicate and easily fusible double silicates, which accentuate the above mentioned drawbacks. Moreover many materials, ores for example, have a tendency to crumble with repeated alternating reduction and oxidation or to crack with heating, whereby the passage of the gas is frequently obstructed and the retort has to be emptied. Even if with very careful working a complete fusing together of the iron charge is in general avoided, it is only with great difficulty that local overheating and obstruction can be prevented, which lead to notable interruptions in the working and in mose cases require frequent fresh charging of the retort. Even with normal behavior of the charge the emptying of the retorts is attended with many difficulties owing to the sticking of the reaction material to the walls; a condition which when the ferroso-ferric oxid fuses, often becomes so serious that the reaction vessel or retort is ruined and has to be withdrawn. To partly overcome these drawbacks it has been proposed to arrange the spongy iron in troughs of refractory material uniformly distributed in the hydrogen-generating portion of the apparatus. This procedure has the drawback that in the first place the space is not fully utilized, and in the second place the refractory material constitutes a poor heat conductor and impairs the smooth progress of the reaction, while on account of overheating in the efforts to obviate the difficulty due to poor heat conduction the formation of easily fusible compounds or iron oxid may give rise to the injurious conditions above referred to.

The present invention has for its object an improved process for the generating of hydrogen by the reactions referred to, and consists substantially in the use of firm compact iron in combination with the spongy iron, the compact iron taking part in the reaction only at its surface.

The inventor has discovered that compact iron used as supporting medium for the spongy iron, is only superficially acted upon in the periods required for the reaction of the iron oxid or the oxidation of the spongy iron, while the inner layers remain unaltered and retain their physical properties such as strength, conductivity for heat, high melting point and the like. When therefore spongy iron reinforced with compact iron is treated with steam, the compact iron is only superficially covered with a thin layer of oxid which is reconverted into metallic iron at the ensuing reduction stage.

In carrying out the process the spongy iron may be supported by or intermingled with compact iron in such manner that the latter constitutes a kind of framework or skeleton for the main bulk of the spongy iron. The compact iron, for example, may be in the form of wires, bars, sheets, rails, rings, perforated cases, tubes, wire gratings, wire netting, wire cloth and the like. It is of special advantage to use wrought iron or steel, as these materials are very slowly acted upon by steam and have a melting point far above the reaction temperatures coming into consideration, so that the material, even if fusion of the spongy material takes place, still retains considerable strength and does not lose its form.

The present process has the advantage that owing to the excellent heat conductivity of the compact iron parts, the heat is more uniformly distributed through the entire mass which greatly diminishes the danger of local fusion of the same. Even if, however, fusion of the spongy material starts, this cannot cause obstruction of the passages, since wherever the compact iron is present, passages are kept open for the penetration of the gas. A further great advantage lies in the fact that even if the spongy iron fuses, the removal of the charge can always be readily effected, since the reaction material owing to its framework of compact iron retains its shape.

In one method of carrying out the present process the charge is piled in separated pieces in the reaction vessel, so that under all conditions free passage for the gases is insured while at the same time a direct heating of the reaction material is possible. The spongy iron may also be charged in the channels of a number of iron bars of U-shaped cross section piled in the reaction vessel with the openings of the channels upward. Another method is to pile a number of troughs of compact iron, filled with spongy iron, in the reaction vessel, which may be effected, for example by arranging the troughs on superposed supports or gratings. Perforated cases, boxes, tubes or the like may be filled with the spongy iron and arranged in the reaction vessel in such manner that the gas or the steam has to flow around the separate boxes etc. and through the perforations of the same to react on their spongy iron contents, while the spaces between the boxes, etc., insure a free flow of the gases should the contents of the boxes fuse. With this arrangement it is impossible for interruptions to occur owing to obstruction of the flow of gas and the reaction material cannot fuse to the walls of the boxes, etc., so that the latter can be easily emptied, also any damaged boxes etc. can be readily removed.

Figure 8:
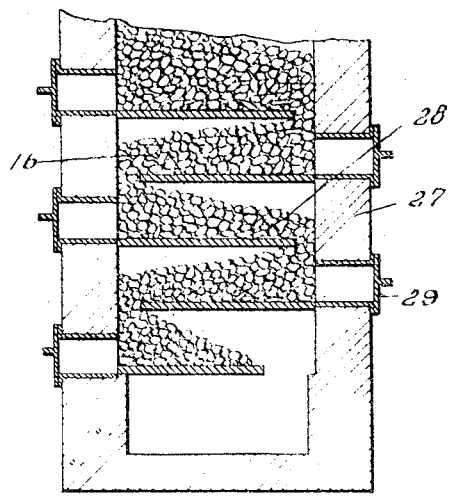
Figure 9:
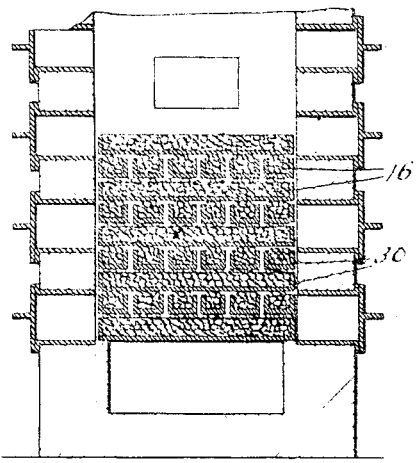
Figure 10:
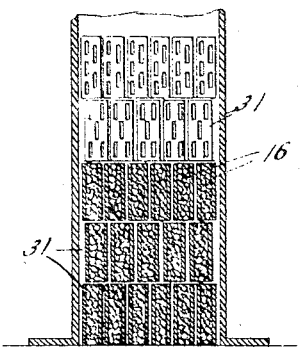

Figure 1 is a vertical section of a complete hydrogen producing apparatus of a type disclosed in my copending application 706,118, filed June 26, 1912; Figs. 2, 3, 4, 5, 6 and 7 are fragmental views in vertical section of alternative methods of charging hydrogen producing retorts; Fig. 8 is a fragmental view in vertical section of a charge under the present invention disposed in a shaft furnace; Fig. 9 is a similar view of a modification; and Fig. 10 is a fragmental vertical section of another modification.

In this illustration in Fig. 1, element 1 designates a casing or furnace chamber carrying within it a checkerwork 2 of firebrick or other refractory material. Disposed within this chamber is a retort or hydrogen generator 3 in open communication with the furnace chamber at 4. This retort may be of iron. It is supported at the top on flanges 5 and is provided with a removable cap or damper 6 and side conduit 7 which may serve to remove hydrogen or introduce gas as the case may be. The furnace chamber is provided at its top with conduit 8 provided with a removable top 9 and connects with steam pipe 10. At the base, the apparatus is provided with casing 11 having side ports 12 for the introduction of air. The top of this casing serves as a support for the column of material in the retort. Gas conduit 13 provided with nostrils 14 serves for introducing gas or steam. The three-way valve 15 allows steam to be sent upward from $10^b$ or downward from $10^a$ through the checker chamber. In use, the material within the retort is alternately reduced by combustible gas such as producer gas, blue water gas, etc., and blown with steam to form hydrogen. In the reducing pass, gas may enter through 7, pass downward through the generator 3 and be burnt in the checker chamber by air from 12, the products of combustion escaping through 8. Gas may enter through 14 and be burned in the checker in heating up the apparatus. In the hydrogen generating phase, the checker chamber may be blown out with steam from $10^b$ and the superheated steam in the chamber then forced upward through the charge by introducing steam through $10^a$. Many other ways of operating the structure are possible. In any use of this structure, it is obvious that permeability of the charge in the retort is important. This it is the object of the present invention to secure. In the reducing phase, metallic iron is produced and in the hydrogen phase, this iron is converted into oxid.

Figure 7:
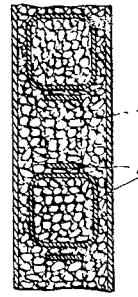

It is the object of the present invention to use the iron in two different conditions: one, compact iron where only the surface operates, and the other porous iron produced by the production of lumps of iron ore or the like and to have these two kinds in such proportions and in such relative arrangement as to give a maximum permeability with the maximum amount of surface. In the structure of Fig. 1, the charge in the retort is composed of alternating layers of iron ore or other porous contact mass 16 and bundles of wrought iron tubes 17. The tubes serve to carry the porous iron produced from the ore and themselves give a large surface of iron or of oxid. In Fig. 2, there is a charge of iron ore 16 having interspersed through it at intervals short pieces of iron or steel 18. In Fig. 3, the charge is composed of hollow pieces of iron 19 packed with lumps of iron ore or iron sponge 16. In Fig. 4, the iron ore layers 16 are separated by perforated plates or grids 20 separated by spacing pieces 21. In Fig. 5, there is a central or axial steel or iron support 22 provided at intervals with flanges or perforated plates 23. In Fig. 6, T shaped plates 24 and 25 are used. Advantageously, these T shaped plates in alternation are at right angles to each other as shown. In Fig. 7, the support is afforded by large iron rings or annual plates 26. In Fig. 8, is shown another type of generator from that of Fig. 1, this generator consisting of a shaft furnace 27 provided with cross plates 28 of iron or the like on which iron ore 16 is piled. These cross plates extend only part way across the shaft so as to give a zigzag passage for gas and steam passing therethrough. Doors 29 allow access to the charge. In Fig. 9, spaced U-shaped plates or channels of iron 30 are stacked above each other in crosswise arrangement and filled with iron ore. In Fig. 10, the iron ore or iron sponge is contained in perforated vertically disposed short stacked tubes 31 shown in section in the lower part of the figure and in elevation in the upper.

What I claim is:—

1. An improved process for the generation of hydrogen by the alternate oxidation of spongy iron by a draft current of steam and the reduction of the resulting iron by a draft current of reducing gases, which comprises passing the various draft currents through a charge of spongy iron combined with compact iron, the surface layers only of the compact iron taking part in the reactions as set forth.

2. An improved process for the generation of hydrogen by the alternate oxidation of spongy iron by a draft current of steam and the reduction of the resulting iron oxid by the reducing gases, which comprises passing the various draft currents through a charge of spongy iron contained in open receptacles composed of compact iron arranged in the reaction vessel as set forth.

3. An improved process for the generation of hydrogen by the alternate oxidation of spongy iron by a draft current of steam and the reduction of the resulting iron oxid by reducing gases, which comprises passing the various draft currents through a charge composed of separate masses of spongy iron intermingled with and reinforced by compact iron in the reaction vessel as set forth.

4. An improved process for the generation of hydrogen by the alternate oxidation of spongy iron by a draft current of steam, and the reduction of the resulting iron oxids by reducing gases, which comprises passing the various draft currents through a charge of spongy iron in receptacles of compact iron having walls pervious to gas, arranged in the reaction vessel, as set forth.

5. An improved process for the generation of hydrogen by the alternate oxidation of spongy iron by a draft current of steam and the reduction of the resulting iron oxid by reducing gases, which comprises passing the various draft currents through a charge composed of masses of combined spongy iron and compact iron arranged with interspaces between the said masses in the reaction vessel, as set forth.

In testimony whereof I have signed my name to this specification in the presence of two subscribing witnesses.

ANTON MESSERSCHMITT.

Witnesses:
AMIS VAMDORY,
TH. THROENBEREND.